US009611390B2

United States Patent
Dietz et al.

(10) Patent No.: US 9,611,390 B2
(45) Date of Patent: Apr. 4, 2017

(54) PIGMENTS WITH AN IRON SILICATE-CONTAINING COATING

(75) Inventors: Johann Dietz, Dietzenbach (DE); Doreen Warthe, Griesheim (DE); Ute Honeit, Darmstadt (DE)

(73) Assignee: MERCK PATENT GESELLSCHAFT MIT BESHRANK TER HAFTUNG, Darmstadt (DE)

( * ) Notice: Subject to any disclaimer, the term of this patent is extended or adjusted under 35 U.S.C. 154(b) by 543 days.

(21) Appl. No.: 13/123,332

(22) PCT Filed: Oct. 2, 2009

(86) PCT No.: PCT/EP2009/007059
§ 371 (c)(1),
(2), (4) Date: Apr. 8, 2011

(87) PCT Pub. No.: WO2010/040476
PCT Pub. Date: Apr. 15, 2010

(65) Prior Publication Data
US 2011/0196046 A1  Aug. 11, 2011

(30) Foreign Application Priority Data
Oct. 10, 2008  (DE) .......... 10 2008 050 924

(51) Int. Cl.
*C09C 1/62* (2006.01)
*C09C 1/00* (2006.01)
*C09D 5/36* (2006.01)
*C09D 7/12* (2006.01)
*C09D 11/037* (2014.01)
*C08K 3/36* (2006.01)
*C08K 9/02* (2006.01)

(52) U.S. Cl.
CPC .......... *C09C 1/0015* (2013.01); *C09C 1/0021* (2013.01); *C09D 5/36* (2013.01); *C09D 7/1225* (2013.01); *C09D 11/037* (2013.01); *C08K 3/36* (2013.01); *C08K 9/02* (2013.01); *C09C 2200/1004* (2013.01); *C09C 2210/10* (2013.01)

(58) Field of Classification Search
CPC .................. C09C 1/0078; C09D 5/36
USPC ........ 106/31.9, 417; 252/588, 387; 514/770; 501/154; 512/7; 424/76.1, 642; 426/540
See application file for complete search history.

(56) References Cited

U.S. PATENT DOCUMENTS

| | | | | |
|---|---|---|---|---|
| 4,867,793 A * | 9/1989 | Franz et al. | .................. | 106/415 |
| 5,008,143 A * | 4/1991 | Armanini | ...................... | 428/207 |
| 7,255,736 B2 * | 8/2007 | Pfaff et al. | ..................... | 106/482 |
| 8,080,307 B2 * | 12/2011 | Demartin Maeder et al. | .......................... | 428/211.1 |
| 2008/0051500 A1 * | 2/2008 | Wiese | ...................... | C08F 2/24 524/431 |
| 2008/0110371 A1 | 5/2008 | Hollman et al. | | |
| 2008/0200560 A1 | 8/2008 | Kniess et al. | | |
| 2008/0207772 A1 * | 8/2008 | Kniess et al. | ................. | 514/769 |

FOREIGN PATENT DOCUMENTS

DE  102005030242 A1  1/2007
WO  WO 2006008239 A2 *  1/2006

OTHER PUBLICATIONS

International Search Report, dated Aug. 12, 2010, issued in corresponding application PCT/EP2009/007059.
English Translation of Taiwanese Office Action dated Mar. 19, 2014—Taiwanese Application No. 098134351.

* cited by examiner

*Primary Examiner* — Kaj K Olsen
*Assistant Examiner* — Ross J Christie
(74) *Attorney, Agent, or Firm* — Millen White Zelano and Branigan, PC; Csaba Henter; Anthony Zelano

(57) ABSTRACT

The present invention relates to pigments which comprise a substrate and an iron(II) silicate-containing coating applied thereto, to a process for the preparation of these pigments, and to the use thereof.

16 Claims, No Drawings

PIGMENTS WITH AN IRON SILICATE-CONTAINING COATING

The present invention relates to pigments comprising a substrate and an iron(II) silicate-containing coating applied thereto, to a process for the preparation of these pigments, and to the use thereof.

Traditionally, colouring in industrial and other applications, such as cosmetics, inks, in particular printing inks, paints, plastics, ceramic materials and the like, is frequently carried out using effect pigments, which, besides desired colour effects, are able to generate, in particular, a high gloss effect, a subtle shimmer and a weak colouring which varies depending on the angle. Such pigments are generally based on substrates such as mica, synthetic flakes comprising $SiO_2$, glass or $Al_2O_3$, which are coated with one or more layers, for example of metal oxides. Metal oxides are preferably employed as layer materials since they can be applied well to the substrates by wet-chemical deposition processes and are very substantially chemically inert. Owing to their high transparency, such pigments can be mixed particularly well with other organic or inorganic colorants. Many different cosmetic and industrial applications on the basis of such pigments or mixtures are therefore common.

Particularly in recent years, however, pigments which have striking colour properties which vary depending on the viewing angle (colour flop, optically variable behaviour) have entered the field of interest for a wide variety of potential applications. Although such properties can in principle be obtained with the above-mentioned effect pigments if the substrates and the layers located thereon are perfectly matched to one another, the achievable angle-dependent colour changes remain weak, however, in particular on a white or pale substrate.

However, strong, readily visible colour changes are in demand, especially for counterfeiting-proof applications in the security sector. Effect pigments which are coated with coloured metal oxides, so that the absorption colour of the metal-oxide layers and the interference colours obtainable due to the entire layer structure are superimposed on one another (so-called combination pigments), resulting overall in a stronger colour impression, have therefore also already been proposed. However, the hues which can be achieved in the case of these pigments are strongly linked to the inherent absorption colour of the metal-oxide layers, and it is only with difficulty that the purity of the hues can be adjusted so that all colours which are visible depending on the viewing angle are clearly evident and pure.

Various proposals have therefore been made to increase the hiding power of effect pigments which change the colour depending on the viewing angle so that this effect is readily evident. To this end, pigments have been provided which have strongly reflective opaque substrates, for example metal substrates, and/or semitransparent metal layers on the substrate, which results in highly opaque pigments which reflect strongly. However, even highly opaque pigments cannot always be employed advantageously since they completely hide any substrate and thus give no possibility for allowing information on the substrate to be visible. In addition, the use of metal substrates is often associated with high technical complexity and is not always straightforward from a security point of view. The application of metal layers also requires high equipment and technological complexity, together with the corresponding high production costs.

In security applications in particular, possibilities for providing multifunctional pigments which, besides a strong viewing angle-dependent colour impression, which cannot be copied, also have further detectable properties, such as magnetisability, electrical conductivity, luminescence in the visible and invisible wavelength range and the like, have also recently been sought. Such pigments and security features produced therewith can be detected in various security classes (i.e. with and without aids) and can thus be employed particularly advantageously, in particular, in security applications.

It is known to produce magnetisable layers in effect pigments using, for example, various modifications of iron oxides, such as $\gamma\text{-}Fe_2O_3$ or $Fe_3O_4$. Pigments are obtained here which, in the case of coating with iron(III) oxide, have a red-brown mass tone, while coatings with magnetite result in pigments having a black or dark mass tone, which may additionally also have interference colours. However, gloss, hiding power, mass tone, interference colours and functionality often cannot be brought into accord in the case of these pigments in such a way that all these requirements are satisfied simultaneously. In particular, it is difficult, when achieving adequate magnetisability, to achieve an optically attractive appearance of the pigments, and in particular a readily visible colour play between clear colours which varies depending on the viewing angle.

The object of the present invention therefore consists in providing pigments which, in the application, have a high hiding power from at least one observation angle, have a readily visible colour play between at least two colours which is strongly dependent on the viewing angle, and additionally have at least one further functionality, can be prepared from inorganic starting materials by means of a relatively simple preparation process and can be used in a versatile manner.

A further object consists in providing a process for the preparation of the pigments according to the invention.

A further object consists in indicating the use of the pigments according to the invention.

The object of the present invention is achieved by pigments which comprise a substrate and an iron(II) silicate-containing coating.

The iron(II) silicate-containing coating can either be located directly on the substrate or, however, also on a coating which is already present on the substrate. However, it is likewise possible also to provide a further iron(II) silicate-containing coating both directly on the substrate and also on a further layer additionally applied to the iron(II) silicate-containing coating.

It is advantageous here for the layer which is in each case below the iron(II) oxide-containing coating to consist of silicon dioxide and/or silicon oxide hydrate to a high proportion by weight.

In a first embodiment, the iron(II) silicate-containing coating is located directly on the substrate. In this case, it is advantageous for the substrate to consist of at least 80% by weight, based on the total weight of the substrate, of silicon dioxide and/or silicon oxide hydrate. In addition, it may comprise up to 20% by weight, based on the total weight of the substrate, of particulate and/or dissolved colorants. The substrate preferably consists of 95 to virtually 100% by weight of silicon oxide and/or silicon oxide hydrate, where only traces or small percentages of foreign ions may be present. In particular, the substrate is in flake form.

For the purposes of the present invention, flake-form is regarded as being a flat structure which, with its top and bottom, has two surfaces which are approximately parallel to one another and whose length and width represent the greatest dimension of the pigment. The separation between the said surfaces, which represents the thickness of the flake, has, by contrast, a smaller dimension.

The substrates described above are also known as $SiO_2$ flakes, even if they comprise proportions of hydrated silicon oxide.

They are highly transparent and, if no colorants are present, colourless. They have flat and very smooth surfaces and a uniform layer thickness.

The substrates are regarded as transparent if they essentially, i.e. to the extent of at least 90%, transmit visible light.

A coating which comprises iron(II) silicate is located on this substrate. The iron(II) silicate here is at least partly in the form of $Fe_2SiO_4$ (fayalite). In addition, however, a further iron(II) silicate, namely $FeSiO_3$ (clino-ferrosilite) may also be present in the coating. The proportion of iron(II) silicate in the coating is between 1 and 99% by weight, based on the total weight of the coating, preferably from 5 to 80% by weight and particularly preferably 15 to 60% by weight. The proportion of $Fe_2SiO_4$ in the total weight of the iron(II) silicates should always be higher than the proportion of $FeSiO_3$. In particular, the proportion of $Fe_2SiO_4$ is from 1 to 60% by weight, preferably from 5 to 50% by weight, based on the total weight of the coating.

$Fe_2SiO_4$ is highly transparent and has a weakly yellowish, olive to brown inherent colour. In addition, it is highly temperature-resistant and has a high refractive index n of about 1.9.

It is furthermore advantageous for the coating, in addition to the high-refractive-index $Fe_2SiO_4$ and optionally to the $FeSiO_3$, also to comprise further high-refractive-index materials or materials which have a positive influence on, in particular, the hiding power and/or the refractive index of the layer and the functional properties thereof.

Particular mention should be made here of iron(II) oxide in the wüstite phase ($Fe_{0.90-0.95}O$), $Fe_3O_4$ (magnetite) and metallic iron. These may each be present in the coating individually in combination with iron(II) silicate or alternatively in mixtures of 2 or 3, in each case with iron(II) silicate.

Particular preference is given here to the combinations $Fe_2SiO_4$+FeO (wüstite)

$Fe_2SiO_4$+FeO (wüstite)+$FeSiO_3$ $Fe_2SiO_4$+FeO (wüstite)+$Fe_3O_4$ (magnetite)

$Fe_2SiO_4$+FeO (wüstite)+$Fe_3O_4$ (magnetite)+$FeSiO_3$ $Fe_2SiO_4$+FeO (wüstite)+Fe $Fe_2SiO_4$+FeO (wüstite)+$FeSiO_3$+Fe $Fe_2SiO_4$+FeO (wüstite)+$Fe_3O_4$ (magnetite)+Fe $Fe_2SiO_4$+FeO (wüstite)+$Fe_3O_4$ (magnetite)+$FeSiO_3$+Fe These are present in different proportions in the coatings described above. These are from 0 to about 70% by weight for magnetite, from 1 to about 70% by weight for wüstite, and from 0 to about 8% by weight, preferably from 0.1 to 4% by weight, for metallic iron, in each case based on the total weight of the coating.

Besides the said materials, further materials, in particular oxides, may also be present in the coating. Thus, for example, proportions of $SiO_2$, in particular in the cristobalite modification, may also be present in the coating. It goes without saying here that the total weight of the coating is in each case 100% by weight.

In addition, one or more further layers comprising metal oxides, metal oxide hydrates, metal suboxides, metal fluorides, metal nitrides, metal oxynitrides and/or mixtures thereof may additionally be present on this iron(II) silicate-containing coating.

The metal oxide, metal oxide hydrate, metal suboxide, metal, metal fluoride, metal nitride, metal oxynitride layers or the mixtures thereof can be of low refractive index (refractive index<1.8) or high refractive index (refractive index≥1.8). Suitable metal oxides and metal oxide hydrates are all metal oxides or metal oxide hydrates to be applied as layers, such as, for example, aluminium oxide, aluminium oxide hydrate, silicon dioxide, silicon dioxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, the titanium suboxides. A suitable metal fluoride is, for example, magnesium fluoride. Metal nitrides or metal oxynitrides which can be employed are, for example, the nitrides or oxynitrides of the metals titanium, zirconium and/or tantalum. Preference is given to the application of metal oxide, metal, metal fluoride and/or metal oxide hydrate layers and very particularly preferably colourless metal oxide and/or metal oxide hydrate layers. Multilayered structures comprising high- and low-refractive-index metal oxide, metal oxide hydrate, metal or metal fluoride layers may furthermore also be present, with high- and low-refractive-index layers preferably alternating. Layers of metal oxides, in particular colourless metal oxides, are also particularly suitable here.

Particularly suitable materials of high refractive index are, for example, $TiO_2$, $ZrO_2$, ZnO, $SnO_2$ and/or mixtures thereof. $TiO_2$ is particularly preferred. The thickness of these layers is in each case about 3 to 300 nm and preferably 20 to 200 nm.

Particularly suitable materials of low refractive index are, for example, $SiO_2$, $SiO(OH)_2$, $Al_2O_3$, $AlO(OH)$, $B_2O_3$, $MgF_2$ and/or mixtures thereof. $SiO_2$ is particularly preferred. The thickness of the individual layers of these materials is between 3 and 300 nm, they are preferably thicker than 20 nm and up to 200 nm thick.

However, very particular preference is given to the embodiment in which only one iron(II) silicate-containing coating is present on the substrate and the pigment is optionally subjected to a further, conventional post-coating for better compatibility with the application medium.

In a second embodiment, the pigment according to the invention has a transparent or semitransparent substrate, which is a conventional substrate for the preparation of effect pigments, for example a flake-form synthetic or natural mica, a further phyllosilicate, glass, borosilicate, $Al_2O_3$, $TiO_2$ and/or BiOCl. In particular, the substrates are then flake-form mica, flake-form glass or flake-form $Al_2O_3$.

A layer which consists of at least 80% by weight of silicon dioxide and/or silicon oxide hydrate, based on the total weight of the layer, is preferably located on this substrate. The iron(II) silicate-containing coating, which has the composition already described above, is arranged on this layer.

It is likewise possible for one or more layers which comprise metal oxides, metal oxide hydrates, metal suboxides, metal fluorides, metal nitrides, metal oxynitrides and/or mixtures thereof additionally to be located between the substrate and the layer consisting of at least 80% by weight of silicon dioxide and/or silicon oxide hydrate. The materials already described above can be employed. Preference is given to one or more layers of metal oxides, in particular of colourless metal oxides.

Further embodiments of the following composition are also possible: Substrate (at least 80% by weight of silicon dioxide and/or silicon oxide hydrate)/iron(II) silicate-containing layer/optionally one or more layers of the above-mentioned materials/layer of $SiO_2$ (at least 80% by weight, as described above)/iron(II) silicate-containing layer; or substrate (transparent, mica, etc., as described above)/optionally one or more layers of the above-mentioned materials/layer of $SiO_2$ (at least 80% by weight, as described above)/iron(II) silicate-containing layer/optionally one or more layers of the above-mentioned materials/layer of $SiO_2$ (at least 80% by weight, as described above)/iron(II) silicate-containing layer.

In general, however, a complicated layer structure makes preparation of the pigments much more expensive and is often not in an appropriate ratio to the achievable advantages.

Embodiments 1 and 2 are therefore preferred, in particular embodiment 1 with no or at most two successive layers of preferably colourless metal oxides, which serve for colouring, in particular through interference effects.

These successive layers are independent of the conventional post-coatings, which, as already described above, are intended to improve the applicational properties of the pigments according to the invention.

Such post-coatings are usually applied to the surface of effect pigments as required and depending on the application medium. This post-coating can have an inorganic and/or organic character. Examples of coatings of this type are given, for example, in EP 0 632 109, U.S. Pat. No. 5,759, 255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is hereby incorporated by way of reference. In addition to the optical properties already mentioned, pigments comprising an organic coating, for example of organosilanes or organotitanates or organozirconates, additionally exhibit increased stability to weathering influences, such as, for example, moisture and light, which is of particular interest for industrial coatings and in the automobile sector. The stabilisation can be improved by inorganic components in the additional coating. In addition, it is also possible to base the additional coating on inorganic materials, in particular on oxides and oxide hydrates of the elements silicon, aluminium, zinc, tin, cerium and/or zirconium. Overall, the respective proportions for the additional stabilising coating should be selected so that the optical properties of the pigments according to the invention are not significantly affected. This is also achieved, in particular, by very small layer thicknesses of a few nanometers.

The length and width dimension of all said substrates for the pigments according to the invention is between 2 and 250 μm, preferably between 2 and 100 μm, and in particular between 5 and 60 μm. It also represents the value that is usually referred to as the particle size of the substrates. This is not crucial per se, but a narrow particle-size distribution of the substrates is preferred. The thickness of the substrates is generally between 0.05 and 5 μm, preferably from 0.1 to 4.5 μm and particularly preferably from 0.2 to 1 μm.

The substrates have an aspect ratio (ratio of length to thickness) of at least 2, preferably of at least 10 and particularly preferably of at least 50, but this may also be up to 2000.

The thickness of the iron(II) silicate-containing coating is between 1 and 200 nm, preferably between 10 and 150 nm and in particular between 30 and 100 nm.

The present invention also relates to a process for the preparation of the pigments according to the invention in which a substrate which consists of at least 80% by weight, based on the total weight of the substrate, of silicon dioxide and/or silicon oxide hydrate, or a substrate which has an outer layer which consists of at least 80% by weight, based on the total weight of the layer, of silicon dioxide and/or silicon oxide hydrate, is provided with an iron(III) oxide-containing coating and subsequently reacted in a reducing medium with formation of iron(II) silicate and optionally coated with one or more further layers.

The coating of the substrate or of the substrate pre-coated with an $SiO_2$ layer (layer which consists of at least 80% by weight, based on the total weight of the layer, of silicon dioxide and/or silicon oxide hydrate) with an iron(III) oxide-containing coating can be carried out here by wet-chemical methods known per se, as described, for example, in U.S. Pat. No. 3,087,828, U.S. Pat. No. 3,087,929, DE-A 19 59 998, DE-A 22 44 298, DE-A 23 13 331, DE-A 27 23 871, DE-A 30 30 056 and DE-A 32 37 264.

To this end, a suspension of substrate particles in water is heated to a suitable temperature below 100° C., and an aqueous iron salt solution is added with stirring and at a suitable pH until iron oxide hydrate has deposited on the substrate in the desired layer thickness. During the precipitation reaction, the pH is kept constant by metered addition of a caustic lye. After the deposition of the iron(III) oxide hydrate-containing layer, stirring is generally continued for a little longer in order to complete the reaction, and the pigment formed is optionally washed and/or dried.

The resultant pigment is subsequently reacted in a reducing medium with formation of iron(II) silicate. The reducing medium here advantageously consists of a reducing gas. In principle, all reducing gases come into consideration for this purpose, preferably hydrogen, carbon monoxide, methane and ammonia. These gases can be employed in pure form or diluted with an inert gas. Preference is given here to the use of a mixture of hydrogen and nitrogen. The latter is particularly preferably present in a mixing ratio such that the proportion of hydrogen is between 2.5 and 25% by vol.

The reducing treatment is carried out at a temperature of greater than 650° C., preferably from 680 to 1000° C. and in particular from 700° C. to 850° C.

At temperatures below 650° C., no iron(II) silicate forms. At these temperatures, only magnetite and, to a small extent, iron(II) oxide in the wüstite phase are formed. Surprisingly, however, it has been found that the formation of iron(II) silicate from the iron of the iron oxide hydrate coating and the silicon dioxide of the substrate or the $SiO_2$ layer located thereon requires a sufficiently large amount of FeO to be present in the wüstite phase since the divalent iron oxide FeO likewise present in magnetite does not react with the $SiO_2$ from the substrate or the $SiO_2$ layer with formation of iron(II) silicate. Elevated temperatures, in particular in the ranges described above, are therefore necessary for the formation of a sufficiently large amount of iron(II) silicate. The higher the temperature selected, the larger the proportion of iron(II) silicate, in particular of $Fe_2SiO_4$, but increasingly also of $FeSiO_3$ and elemental iron. With increasing temperature, the probability that the $SiO_2$ from the substrate or the $SiO_2$ layer reacts to form cristobalite also increases.

The reaction time is generally between 10 minutes and 4 hours.

Any oven to be charged with reducing gas is suitable per se for the reducing reaction. However, the use of a rotary tubular furnace is preferred for a uniform reproducible result.

The pigment obtained in this way can subsequently also be coated with further layers, as already described above. These layers can, like the layers optionally likewise present on the substrate below the silicon dioxide- and/or silicone oxide hydrate-containing layer, be applied by known methods, for example by wet-chemical methods by precipitation from corresponding, preferably inorganic, metal salts in aqueous solution, by deposition from organic metal compounds in a fluidised bed and by CVD or PVD processes. Such processes are usually employed for the coating of pigment substrates and are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017.

The application of the silicon dioxide- and/or silicon oxide hydrate-containing layer (composition as described above) can likewise be carried out by known methods, preferably likewise by wet-chemical methods from inorganic starting materials. To this end, a water-glass solution is metered, for example, into a suspension, heated to a temperature between about 50 and 100° C., of the material to be coated. By simultaneous addition of an acid, the pH is held at a value between 4 and 10, preferably 6.5 to 8.5. When the addition of the desired amount of water-glass solution is complete, the mixture is stirred for a further period in order to complete the reaction.

In addition, an inorganic and/or organic coating can additionally be applied as outer layer as post-coating. Examples of coatings of this type are given, inter alia, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805. Examples of organic coatings and the advantages associated therewith have already been described above under structure of the pigments according to the invention. The process step of application of the organic coating can directly follow the other steps of the process according to the invention. The substances applied here merely comprise, likewise as in the case of an inorganic post-coating, a proportion by weight of 0.1 to 5% by weight, preferably 0.5 to 3% by weight, of the entire pigment.

The $SiO_2$ flakes preferably employed as substrates can be produced, for example, by the belt process described in WO 93/08237, likewise using a water-glass solution as starting material. To this extent, reference is hereby made to the entire contents of WO 93/08237.

Suitable starting materials for the production of $SiO_2$ flakes are, in particular, sodium or potassium water-glass solutions, which are applied to a continuous belt, dried, detached from the belt in flake form, treated with water and acid and optionally washed, dried, calcined and optionally ground and/or classified.

The starting materials may additionally comprise network formers, surface-active substances, viscosity enhancers, particulate and/or dissolved colorants and further additives. These are likewise described in greater detail in WO 93/08237.

With the aid of the process described, $SiO_2$ flakes having a uniform layer thickness and sharp fracture edges can be produced. Uniform layer thickness here is taken to mean a layer thickness whose layer-thickness tolerance (=standard deviation of the layer thickness) is not greater than 10%, in particular not greater than 8% and particularly preferably not greater than 5%.

The object of the invention is likewise achieved by the use of the pigments according to the invention. These can advantageously be employed, for example, in cosmetics, inks, paints, printing inks, plastics, films, in security applications, for colouring seed, for colouring foods, for laser marking, in medicament coatings, in ceramic materials, glasses, paper, for thermal insulation, in dry preparations or in pigment preparations.

Owing to their particularly interesting colouristic and functional properties, the pigments according to the invention can particularly advantageously also and in particular be employed in security applications.

A particular feature of the pigments according to the invention consists in that they, regarded as individual particles, have a slight inherent coloration, but overall (regarded under an electron microscope) are virtually transparent, namely see-through. The percentage overall transmission of the individual particles in the visible wavelength region is in the range from about 35 to about 90%, preferably from 45 to 80%, of the incident light (investigation in transmitted light). This value is unexpectedly high since a significantly more intense inherent coloration of the pigments and a much higher absorption, which is evident from greatly reduced transmission, would have been expected in the presence of iron(II) silicate, in particular the olive- to brown-coloured $Fe_2SiO_4$, and especially in the additional presence of black magnetite.

At the same time, however, the pigments according to the invention as pigment powder have an intense inherent colour, which essentially corresponds to one of the interference colours.

In the application, in particular in coatings and prints which are obtained using pigment-containing printing inks and coating compositions, the pigments according to the invention exhibit intense coloured hues which are dependent on the observation angle and, depending on the layer thickness and choice of substrate, may also be completely independent of the inherent absorption colour of the absorbent ingredients. Thus, intense gold, violet, green or blue shades can be achieved just as well as intense hues in the red region.

In addition, the pigments according to the invention exhibit an apparent hiding power at steep observation angles which is comparable to the hiding power of optically variable metal pigments. At the same time, however, at least translucency is evident at flat observation angles, with dark to black motifs which are already present, for example on the coated substrate, still being visible through the coating comprising the pigments according to the invention. Behaviour of this type cannot be achieved with pigments which comprise strongly absorbent or reflective metal layers.

In addition to their outstanding optical properties, the pigments according to the invention also have very interesting functional properties. In particular, they are both magnetisable and also absorbent for infrared light and have a certain electrical conductivity. All these functional properties can be enhanced by optionally increasing the proportion of, in particular, magnetite and/or elemental iron in the iron(II) silicate-containing coating of the pigments according to the invention. The functional properties of the pigments can thus be set specifically.

It goes without saying that the multifunctional properties described above, combined with optically very attractive colours, make the pigments according to the invention appear particularly suitable for use in decorative applications and in particular in security applications, where this versatility is particularly important in the case of the latter.

Security applications here are taken to mean, in particular, documents of value, in particular banknotes, cheques, credit cards, shares, passports, identity documents, access authorisation cards, driving licences, entry tickets, revenue stamps, postage stamps, labels, seals, packaging materials, in particular packaging of medicaments, foods, perfumes, cigarettes, or products of daily use, in particular clothing, shoes, household articles and the like.

These are provided with at least one security feature which comprises at least one (one type) of the pigments according to the invention.

A security feature of this type preferably consists of a print or coating on a substrate. The print or coating here is produced by means of a printing ink or coating composition which comprises pigments in accordance with the present invention.

Due to the magnetisability of the pigments according to the invention, they can be aligned along the field lines of the magnets employed by means of suitable magnetisation devices in the not yet completely hardened coatings or prints. If the alignment takes place parallel to the coated surface, increased gloss and a better apparent hiding power can be observed at the specular angle.

However, if the alignment takes place at an angle to the coated surface, for example obliquely or perpendicularly, it is possible to produce three-dimensional patterns which, depending on the observation angle, not only have a different brightness behaviour, but also a different colour, due to the angle-dependent colouring of the pigments.

By contrast, the ability of the pigments according to the invention to absorb infrared radiation makes them appear particularly suitable for various laser markings, in particular those using infrared lasers.

It goes without saying that the pigments according to the invention can be mixed with organic or inorganic dyes and pigments and in particular with other effect pigments. Organic pigments and dyes are, for example, monoazo pigments, disazo pigments, polycyclic pigments, cationic, anionic or nonionic dyes. Inorganic dyes and pigments are, for example, white pigments, coloured pigments, black pigments or effect pigments. Examples of suitable effect pigments are metal-effect pigments, pearlescent pigments or interference pigments, which are generally based on mono- or multicoated flakes based on mica, glass, $Al_2O_3$, $Fe_2O_3$, $SiO_2$, etc. Examples of structures and particular properties of the said pigments are given, for example, in RD 471001 or RD 472005, the disclosure content of which is hereby incorporated into the present invention by way of reference. In addition, luminescent dyes and/or pigments and holographic pigments or LCPs (liquid crystal polymers) are suitable as further colorants for blending with the pigments according to the invention. The pigments according to the invention can be mixed with commercially available pigments and fillers in any ratio.

The invention claimed is:

1. A magnetizable pigment exhibiting interference colors, comprising a substrate and an iron(II) silicate-containing coating,
wherein
the substrate is in flake form and comprises at least 80% by weight, based on the total weight of the substrate, of silicon dioxide or silicon oxide hydrate or both; and
where the iron(II) silicate-containing coating is located directly on the substrate, and
wherein the proportion of iron(II) silicate in the coating is 5 to 80% by weight, based on the total weight of the coating,
wherein the pigment is a magnetizable pigment exhibiting interference colors,
wherein the pigment when investigated in transmitted light exhibits a percentage overall transmission of the incident light in the visible wavelength region in the range of 30 to 90 percent and
wherein the substrate has a thickness of 0.2 microns to 5 microns.

2. The pigment according to claim 1, wherein the iron(II) silicate is present in the coating in combination with iron(II) oxide, which is in the wüstite phase.

3. The pigment according to claim 1, wherein the iron(II) silicate is present in the coating in combination with $Fe_3O_4$.

4. The pigment according to claim 1, wherein the iron(II) silicate is present in the coating in combination with metallic iron.

5. The pigment according to claim 1, wherein the iron(II) silicate is $Fe_2SiO_4$.

6. The pigment according to claim 1, wherein one or more layers comprising metal oxides, metal oxide hydrates, metal suboxides, metal fluorides, metal nitrides, metal oxynitrides or mixtures thereof are additionally present on the iron(II) silicate-containing coating.

7. A process for the preparation of a pigment according to claim 1, comprising coating a substrate, which is in flake form, and having at least 80% by weight, based on the total weight of the substrate, of silicon dioxide or silicon oxide hydrate or both, with an iron(III) oxide-containing coating and subsequently reacting in a reducing medium with formation of iron(II) silicate and optionally coating with one or more further layers.

8. The process according to claim 7, wherein the reducing medium is a mixture of nitrogen and hydrogen.

9. The process according to claim 7, wherein the reduction is carried out at temperatures of higher than 650° C.

10. A product selected from the group consisting of cosmetics, inks, paints, printing inks, plastics, films, security applications, seed colouring, foods colouring, laser marking, medicament coatings, ceramic materials, glasses, paper, thermal insulation, dry preparations and pigment preparations, comprising pigments according to claim 1.

11. A method for preparing a product according to claim 10, wherein the security application is carried out by providing documents of value, banknotes, cheques, credit cards, shares, passports, identity documents, access authorisation cards, driving licences, entry tickets, revenue stamps, postage stamps, labels, seals, packaging materials, packaging of medicaments, foods, perfumes, cigarettes, clothing, shoes, household articles, with at least one security feature which comprises said pigments.

12. A method according to claim 11, wherein the security feature is a print or coating on a substrate which is applied by a printing ink or coating composition comprising said pigments.

13. A method according to claim 12, wherein the pigment in the coating or print is aligned with its longest axis parallel, inclined or perpendicular to the surface of the substrate.

14. The pigment according to claim 1, wherein the proportion of iron(II) silicate in the coating is 15 to 60% by weight, based on the total weight of the coating.

15. The pigment according to claim 5, wherein the proportion of iron(II) silicate in the coating is 5 to 50% by weight, based on the total weight of the coating.

16. The pigment according to claim 1, which contains one of the following combination of materials in the coating:

$Fe_2SiO_4+FeO$ (wüstite);

$Fe_2SiO_4+FeO$ (wüstite)$+FeSiO_3$;

$Fe_2SiO_4+FeO$ (wüstite)$+Fe_3O_4$ (magnetite);

$Fe_2SiO_4+FeO$ (wüstite)$+Fe_3O_4$ (magnetite)$+FeSiO_3$;

$Fe_2SiO_4+FeO$ (wüstite)$+Fe$;

$Fe_2SiO_4+FeO$ (wüstite)$+FeSiO_3+Fe$;

$Fe_2SiO_4+FeO$ (wüstite)$+Fe_3O_4$ (magnetite)$+Fe$; or $Fe_2SiO_4+FeO$ (wüstite)$+Fe_3O_4$ (magnetite)$+FeSiO_3+Fe$.

* * * * *